(12) United States Patent
Proux et al.

(10) Patent No.: US 7,668,921 B2
(45) Date of Patent: Feb. 23, 2010

(54) METHOD AND SYSTEM FOR PHISHING DETECTION

(75) Inventors: Denys Proux, Eybens (FR); Eric Cheminot, Meylan (FR); Nicolas Guerin, Notre Dame de Mesage (FR)

(73) Assignee: Xerox Corporation, Norwalk, CT (US)

( * ) Notice: Subject to any disclaimer, the term of this patent is extended or adjusted under 35 U.S.C. 154(b) by 660 days.

(21) Appl. No.: 11/443,240

(22) Filed: May 30, 2006

(65) Prior Publication Data

US 2007/0283000 A1    Dec. 6, 2007

(51) Int. Cl.
  G06F 15/16    (2006.01)
(52) U.S. Cl. ............... 709/206; 709/203; 709/224; 709/225
(58) Field of Classification Search ............... None
  See application file for complete search history.

(56) References Cited

U.S. PATENT DOCUMENTS

| | | | |
|---|---|---|---|
| 7,421,498 B2* | 9/2008 | Packer | 709/225 |
| 2002/0133514 A1* | 9/2002 | Bates et al. | 707/501.1 |
| 2005/0080860 A1* | 4/2005 | Daniell et al. | 709/206 |
| 2005/0144451 A1 | 6/2005 | Voice et al. | |
| 2006/0015722 A1 | 1/2006 | Rowan et al. | |
| 2006/0031319 A1 | 2/2006 | Nlson et al. | |
| 2006/0053202 A1 | 3/2006 | Foo et al. | |
| 2006/0059111 A1 | 3/2006 | Tucker et al. | |
| 2006/0075028 A1 | 4/2006 | Zager et al. | |
| 2006/0080735 A1 | 4/2006 | Brinson et al. | |
| 2006/0123464 A1* | 6/2006 | Goodman et al. | 726/2 |
| 2007/0088785 A1* | 4/2007 | Cama | 709/206 |
| 2007/0136806 A1* | 6/2007 | Berman | 726/22 |
| 2009/0070872 A1* | 3/2009 | Cowings et al. | 726/23 |

* cited by examiner

Primary Examiner—Joseph E Avellino
Assistant Examiner—Dung Huynh
(74) Attorney, Agent, or Firm—Fay Sharpe LLP

(57) ABSTRACT

A method for detection of phishing attempts in received electronic mail messages includes retrieving the source code, displayed text, and a list of all specified addresses contained within the source code of a received electronic message. Visual character normalization is applied to each specified address to develop all possible address combinations and to form a normalized address list. The specified addresses are removed from the normalized address list to create a revised address list, upon which comparison tests are performed to determine if each address in the revised address list is from a valid source. The recipient of the electronic message is informed of any message found to be from an invalid source.

15 Claims, 7 Drawing Sheets

METHOD AND SYSTEM FOR PHISHING DETECTION

BACKGROUND AND SUMMARY

This disclosure relates generally to methods and systems for detecting phishing attempts in incoming electronic messages, and more particularly to a system and method for utilizing normalization and comparison techniques to identify a possible phishing attempt and to notify the electronic message recipient.

Phishing is a form of Internet scam that usually involves the amss sending of email messages which appear to be from a legitimate organization such as a bank or other financial institution or organization. These email messages often direct the recipient to a fraudulent website or form where the recipient is tricked into divulging personal or financial information. An alternative phishing scam may not ask for such information but, upon entering the URL (Internet address assigned to a resource or document by which it can be accessed by a web browser), executes a download of a keystroke-logging program that lets the phisher harvest information from the recipient's machine. The information can then be used for identity theft and fraud.

In forging an address, a commonly used technique is to include in the address some homographic characters (characters which are graphically very similar to one another). For example, if the address appears clearly in the content, an address that is visually as similar as possible to the original address could be used (e.g., instead of ZZZ@amazone.com, ZZZ@amaz0ne.com may be used, in which the character 'o' has been replaced by a zero). Alternatively, if it is a web site URL, it may be hidden in a graphical web page where the URL written on the screen is not associated with the real URL that will be used (e.g., a URL address embedded in an image saying "follow the Change Profile link to modify your Amazone profile, which is actually associated with the URL http://www.amaz0ne.com/profiles.asp which uses the same character replacement as the previous example).

Another approach is utilization of a technique which consists of replacing standard ASCII characters by the Unicode of some other visually similar characters used by non-roman character based languages. For example, a recent case concerned the Paypal website. In this case the forged URL was http://www.pаypal.com/, which appeared on the address bar of the Internet browser as a valid and official Paypal URL (http://www.paypal.com). However, the first "a" was not the standard English form but rather a character from another character set (e.g., Cyrillic). This forgery appeared visually identical to the official address (as displayed in the address field of the browser due to its Unicode interpretation capabilities), but which actually corresponded to a different URL.

Phishing attacks can be costly and can drain a company's resources since a large number of attacks can be run against target companies in large volumes and billions of phishing messages pass through filtering systems that can slow down email delivery, consume valuable server processing time, and can result in the loss of important financial data. Several solutions are known that attempt to address this problem, generally employing sender or recipient authentication. For example, use of a directory of legitimate, transmitting computer addresses, verification of digital signatures, use of a personalized image to authenticate the identity of a transmitter, and identification cards. However, these approaches do not provide the capability for automatically detecting phishing attempts and identifying such attempts to the email recipient.

All U.S. patents and published U.S. patent applications cited herein are fully incorporated by reference. The following patents or publications are noted:

U.S. Patent Application Publication No. 2005/0144451 to Voice et al. ("Method and Apparatus for Providing Electronic Message Authentication") describes electronic message authentication employing an article, such as a card or sticker that includes sender authentication information and location information such as row and column headings. For example, a recipient is issued an article that embodies unique sender authentication information that is identifiable by corresponding location information. When the sender of an electronic message wants to send a message to the recipient, the sender transmits the electronic message and both location information and corresponding desired sender authentication information located at the coordinate identified by the location coordinate information. If the sender authentication information matches the authentication information found on the article, the sender of the message is trusted.

U.S. Patent Application Publication No. 2006/0015722 to Rowan et al. ("Security Systems and Services to Provide Identity and Uniform Resource Identifier Verification") describes a service that allows a user to perform a search on any one or multiple Uniform Resource Identifiers (URL) and/or other protocol addresses accessible via a public or private network to establish a report in a summary or detailed format on the trustworthiness of an address.

U.S. Patent Application Publication No. 2006/0031319 to Nelson et al. ("Hierarchically Verifying the Identity of the Sender of an E-mail Message") teaches verification of the identity of the sender of an email message by performing a number of tests on DNS information. The DNS information is based on a client IP address or a sender address. Each test performed has a corresponding intrinsic confidence value representing the degree of confidence the test provides of the sender identity relationship. If multiple tests are successful, the test result with the highest confidence value is used.

U.S. Patent Application Publication No. 2006/0075028 to Zager et al. ("User Interface and Anti-Phishing Functions for an Anti-Spam Micropayments System") teaches a protocol for protected email transmission using micropayments and a segregated inbox in which protected emails are displayed. The protocol also involves authentication of the sender to defeat phishers and an opt out protocol which can be used to block protected emails from sources from which the user no longer wishes to receive emails even if the source has made a micropayment. A white list is maintained on the protected email server (along with the opt out black list) so that recipients can designate specific senders who may send email to that recipient without paying a micropayment and still have the protected email displayed in the segregated inbox.

U.S. Patent Application Publication No. 2006/0080735 to Brinson et al. ("Methods and Systems for Phishing Detection and Notification") teaches a machine-implemented method for detecting phishing over a computer network. A web page can be accessed and information associated with the web page can be processed. One or more conditions can be set in response to the processing and the conditions can be compared to a set of conditions indicative of a phishing attack. A user can then be informed of a potential phishing attack corresponding to the conditions through the display of an alert window or an icon. The actions can also be performed in response to a user's selection of a link appearing in an email message.

The disclosed embodiments provide examples of improved solutions to the problems noted in the above Background discussion and the art cited therein. There is shown in these examples an improved method for detection of phishing attempts in received electronic mail messages. The method includes retrieving the source code, displayed text, and a list of all specified addresses contained within the source code for an electronic message. Visual character normalization is applied to each specified address to develop all possible address combinations and to form a normalized address list. The specified addresses are removed from the normalized address list to create a revised address list, upon which comparison tests are performed to determine if each address in the revised address list is from a valid source. The recipient of the electronic message is informed of any message found to be from an invalid source.

In an alternate embodiment there is disclosed a system for detection of phishing attempts in received electronic mail messages in a networked environment, which includes a plurality of personal computers, and electronic mail server. When an electronic mail message is received the source code, displayed text and the addresses specified in the source code are retrieved. Visual character normalization is applied to each of the specified address to develop all possible address combinations and to form a normalized address list combined with the specified addresses. A revised address list is created through removal of the specified addresses from the normalized address list and comparison test are performed on each address in the revised address list to determine whether an address is valid. The recipient of the electronic message is informed if an electronic message is not from a valid source.

In yet another embodiment there is disclosed a non-transitory computer-readable storage medium having computer readable program code embodied in the medium which, when the program code is executed by a computer, causes the computer to perform method steps for detection of phishing attempts in received electronic mail messages. The method includes retrieving the source code, displayed text, and a list of all specified addresses contained within the source code for an electronic message. Visual character normalization is applied to each specified address to develop all possible address combinations and to form a normalized address list. The specified addresses are removed from the normalized address list to create a revised address list, upon which comparison tests are performed to determine if each address in the revised address list is from a valid source. The recipient of the electronic message is informed of any message found to be from an invalid source.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The phishing detection and notification method and system described herein provides a new approach for identification of phishing attempts. The method and system scans all addresses appearing in the source code of any incoming emails, and then, instead of a simple black list comparison or a detection of the phishing attempt using a Bayesian model, utilizes similarity comparisons to identify addresses that are very close to an officially valid company address. An address that is close to a valid address, but is not an exact match to that address, has a greater possibility of being an attempt to mislead the recipient of the email message with a forgery. If the possibility of a forgery is indicated, the recipient of the email message is notified.

Various computing environments may incorporate capabilities for supporting an electronic mail network on which the phishing detection method and system may reside. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 1:
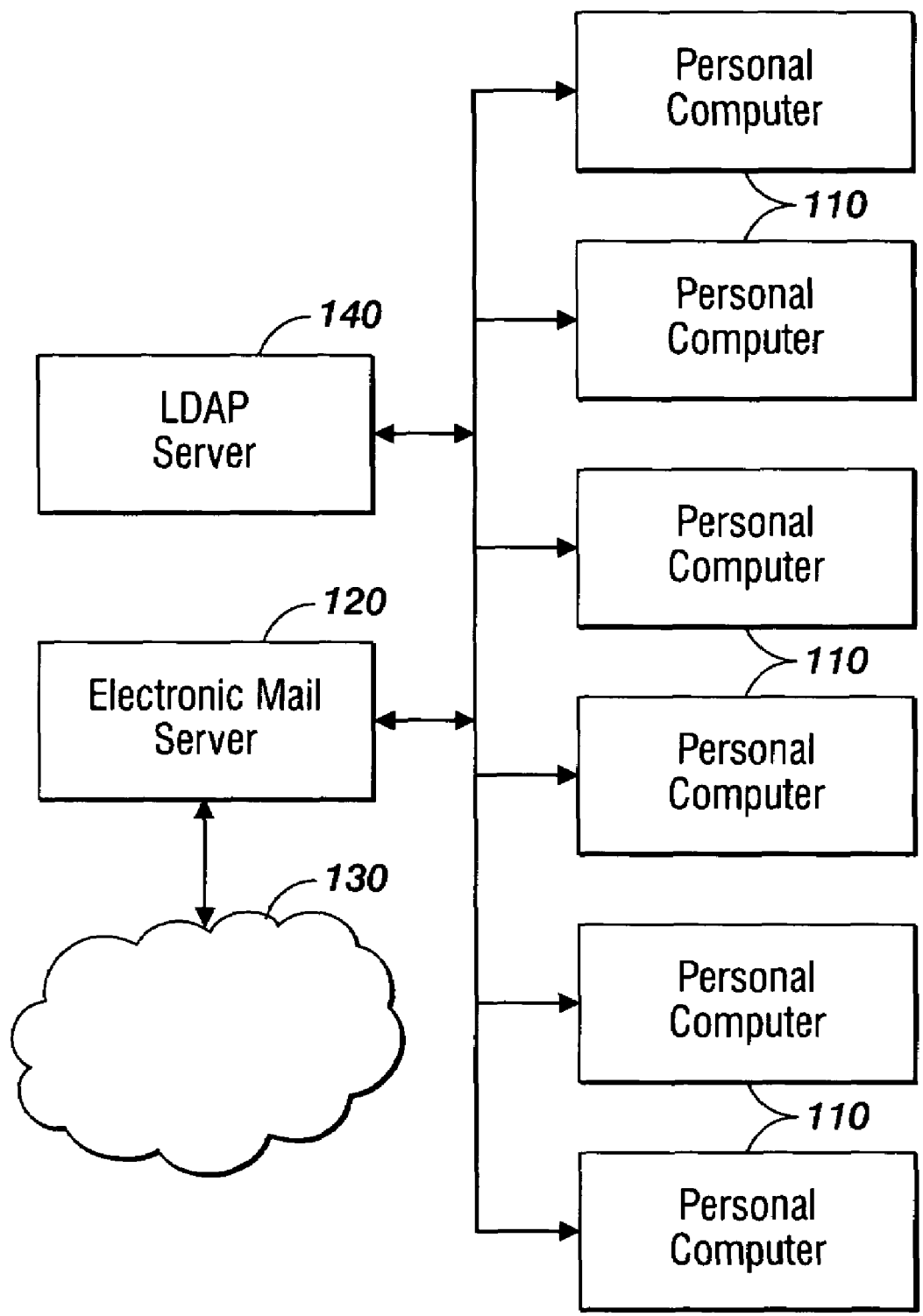
FIG. 1 is a block diagram of a system capable of detecting phishing attempts through electronic mail messages.

Referring to FIG. 1, the schematic diagram illustrates an example embodiment of a system for storing and recalling groups of electronic mail addresses on user interfaces. The phishing detection system and method reside on a computer network including a plurality of computers 110 having email software incorporated into each of the computers for sending and receiving email messages through the communication network having an internet gateway 130. Electronic mail server 120 is a typical electronic mail server that receives and routes email from and to a set of users through network 130. It uses standard email protocols and network connections (such as SMTP (Simple Mail Transfer Protocol) over TCP/IP (Transmission Control Protocol/Internet Protocol)) to perform its service: LDAP (Lightweight Directory Access Protocol) server 140 provides access to a company-wide electronic mail address book as well as additional functionality. The phishing detection system and method may reside on either or both of the electronic mail server 120 and computers 110.

The computers 110 typically have a processor, random-access memory, read-only memory, and one or more storage devices, such as a hard drive, CD-ROM, DVD, diskette, etc., as well as electronic mail capability. The processor is coupled to an output device, such as a display device, input devices, such as a keyboard, mouse, or pointer, and communication circuitry. The output device, for example a monitor, displays information for viewing by a user of computer 110 and the input device is used to control a screen pointer provided by the graphical user interface of the operating system.

As shown in FIG. 1, the computers 110 are coupled together and communicate via the network 130. In one embodiment, computer 110 includes a modem and corresponding communication drivers to connect to the Internet via what is known in the art as a "dial-up connection". In another embodiment, the computers 110 are coupled together in only a local-area network (LAN). In yet another embodiment, the computers 110 include an Ethernet or similar hardware card to connect to the local-area network that itself is connected to the Internet via what is known in the art as a "direct connection". In further embodiments, the computer 110 may be connected to the Internet using a cable modem or satellite Internet connectivity.

The system and method herein are not limited to a particular type of network system to which the computers 110 are connected. Typical network interfaces include general-purpose systems such as POTS (plain-old telephone systems) and ISDN (Integrated Services Digital Network), as well as special-purpose systems such as a LAN (local-area network) or a WAN (wide-area network). Such networking environments are commonplace in offices, enterprise-wide computer networks, intranets and the Internet. Those skilled in the art will appreciate that the principles of the system and method described herein can be applied to virtually any network system without departing from the scope of the claims and specification.

Electronic mail server 120 receives the electronic mail transmissions from internet gateway 130 and forwards them to the specified recipients.

The particular methods performed by the system for detecting phishing attempts comprise steps which are described below with reference to a series of flow charts. The flow charts illustrate an embodiment in which the methods constitute computer programs made up of computer-executable instructions. Describing the methods by reference to a flowchart enables one skilled in the art to develop software programs including such instructions to carry out the methods on computing systems. The language used to write such programs can be procedural, such as Fortran, or object based, such as C++. One skilled in the art will realize that variations or combinations of these steps can be made without departing from the scope of the disclosure herein.

Figure 2:
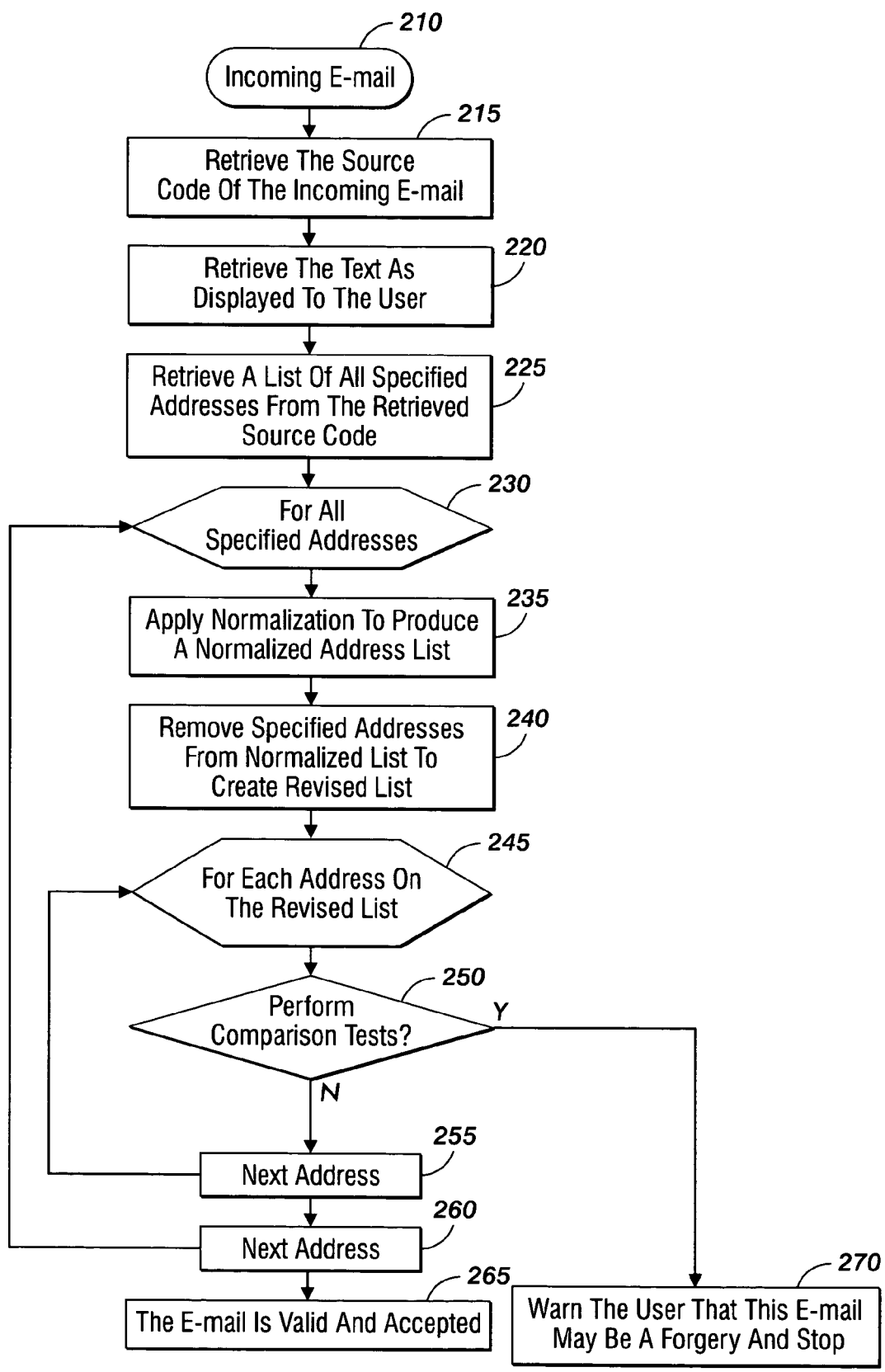
FIG. 2 is a flow chart illustrating one embodiment of the method of detecting phishing attempts.

Turning to FIG. 2, a flow chart illustrates one embodiment of the method for detecting phishing attempts in a networked environment. When an incoming electronic mail message is received at 210, the source code of the message is retrieved at 215. The text, defined for the purposes herein as the text content of the email which is displayed to the user, is retrieved at 220. A list of all specified addresses is retrieved from the source code obtained at 210. The specified addresses may be obtained from the "Return-Path: . . . " section for email addresses, or between HTML tags indicating a reference to a URL (<A href= . . . >) or simply between <> in the plain text section of the message. For each of the addresses in this specified address list (230), visual character normalization techniques, described more fully with respect to FIG. 3 hereinbelow, are applied at 235 to generate all possible address combinations for each of the specified addresses. These are used to develop a normalized address list. The specified addresses are removed from the normalized list at 240 to create a revised list.

For each address in the revised list (245), comparison tests, described more fully with respect to FIGS. 4-7 hereinbelow, are performed at 250 to determine if each address is valid. If the address is not valid, a message is sent to the user at 270 warning that the email may be a forgery and not to respond to the message. If the address is valid, the next address in the revised list is tested at 255 and this process is continued until all addresses in the revised list have been tested. At 260 the next address is retrieved from the source code at 230 and the normalization procedure and comparison tests are performed. If the electronic message is found to be valid, the user is notified that the message is valid and accepted at 265.

Figure 3:
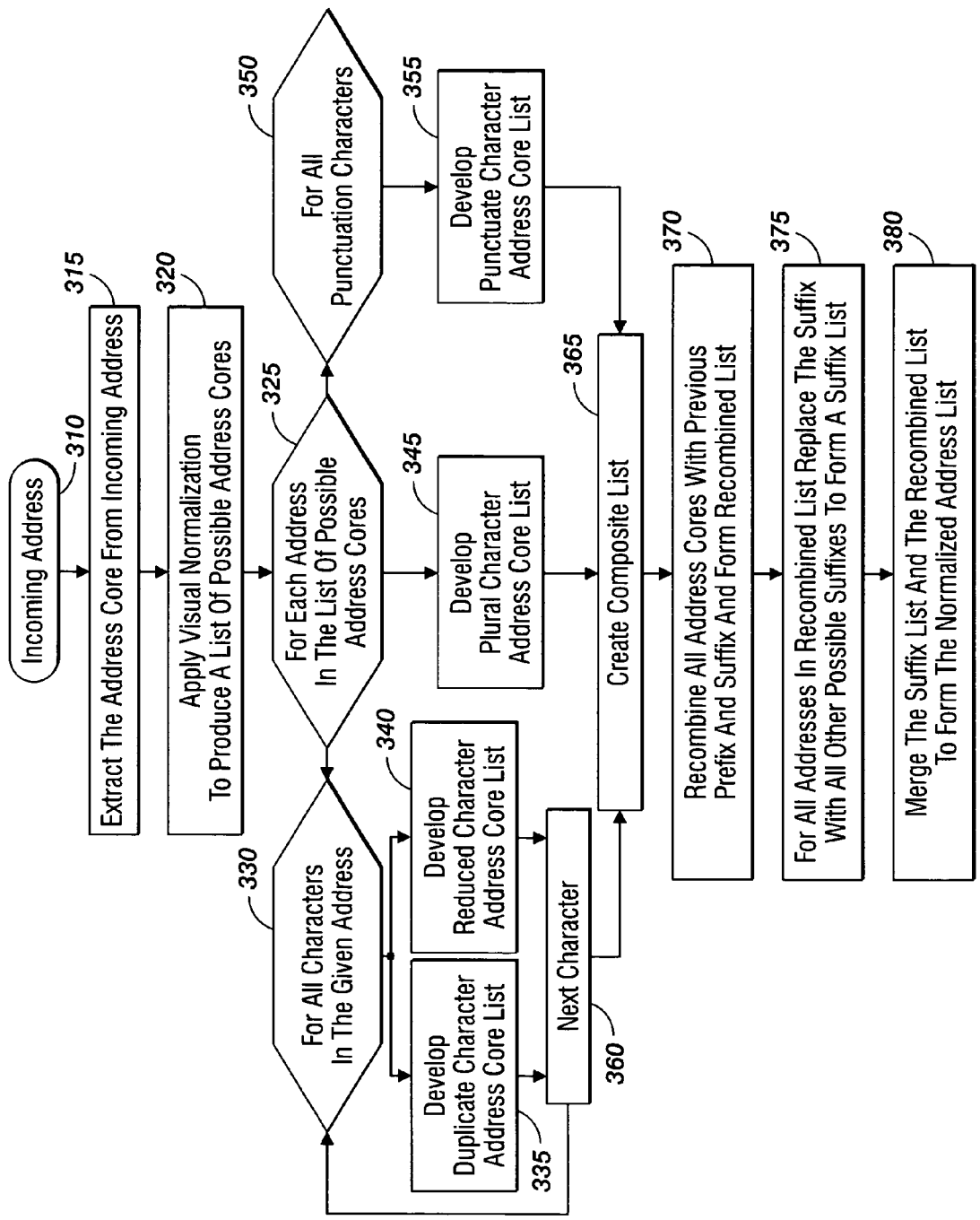
FIG. 3 is a flow chart illustrating the procedure for normalization utilized in the method according to FIG. 2.

Turning now to FIG. 3, the flow diagram illustrates the procedure for normalization utilized by the method for identifying phishing attempts. The incoming address at 310 is usually of the form 'recipient@core.suffix' for example, MrX@xyz.com. The address core, 'xyz' from the example, is extracted from each incoming address at 315. For the purposes herein, an address core is defined as the left side of the address with the last extension for an email address and the text between the 'www' prefix and the last domain extension for a URL. For example, in a URL such as http://www.xyz.com⇒xyz. Visual normalization is then applied at 320 to develop a list of possible address cores. This may include simple character visual normalization, which involves replacing any character (ASCII or Unicode) by its "visual homonym" (a homographic character that looks very similar to another character). To accomplish this, predefined transformation rules for ASCII characters may be used, such as in the following examples:

$1 \leftrightarrows l$ (ascii 49$\leftrightarrows$ascii 108)

$| \leftrightarrows l$ (ascii 124$\leftrightarrows$ascii 108)

$0 \leftrightarrows o$ (ascii 48$\leftrightarrows$ascii 111)

. . .

For Unicode characters, a transcription of any character similar to an Ascii character is transcribed into its Ascii counterpart, as shown in the following sample list of Unicode character transformations:

U0430$\leftrightarrows$U0061 (Cyrillic a$\leftrightarrows$Latin a) $\Rightarrow$a (ascii)

U0435$\leftrightarrows$U0065 (Cyrillic e$\leftrightarrows$Latin e) $\Rightarrow$e (ascii)

U03B1$\leftrightarrows$U0061 (Greek a$\leftrightarrows$Latin a) $\Rightarrow$a (ascii)

. . .

For each address core in the list of possible address cores (325), various techniques are applied to generate additional address combinations. For each and every character in an address core (330), the character is duplicated (for example, 1⇒11, a⇒aa, . . . ) and the resulting address core is placed on a 'duplicate character' address core list at 335. Another character is selected at 360 and the duplication procedure is repeated until no letters remain in the core address, a new core address is selected, and the procedure is repeated for each core address on the list of possible address cores. Similarly, at 340 contiguous duplicated characters in an address core are replaced by a single occurrence of the character (for example, 11⇒1, aa⇒a, . . . ) and the address core thus created is placed in a list to form a 'reduced character' address core list. Additional duplicated characters within an address core are identified at 360 and the replacement procedure is repeated until no contiguous duplicated characters in the core address for each core address on the list of possible address cores remains.

For each possible address core a plural character at the end of the address core is either added (if a plural character is not present), or removed (if a plural character is present) at 345 (for example, www.xyz.com⇒www.xyzs.com). This procedure is repeated for each address core on the list of possible address cores and the address cores thus created form a 'plural character' address core list. For all punctuation characters at 350, the punctuation character is removed at 355 (for example, www.xy.z.com⇒www.xyz.com). This is repeated for each address core on the list of possible address cores and the created address cores form a 'punctuation character' address core list. At 365 the 'duplicate character', 'reduced character', 'plural character', and 'punctuation character' lists are combined with the list of possible address cores and duplicates are removed to create a composite list of address cores. Each address core on the composite address core list is recombined with its previous prefix and suffix at 370 to form a recombined address list. For example, address core 'xyyz' becomes MrX@xyyz.com. For each of the recombined addresses, the original suffix is replaced with all other possible suffixes to form a 'suffix' address list at 375 (for example, .com⇒net, .com⇒.org, . . . ). The 'suffix' list is merged with the recombined address list to create a normalized address list at 380.

Figure 4:
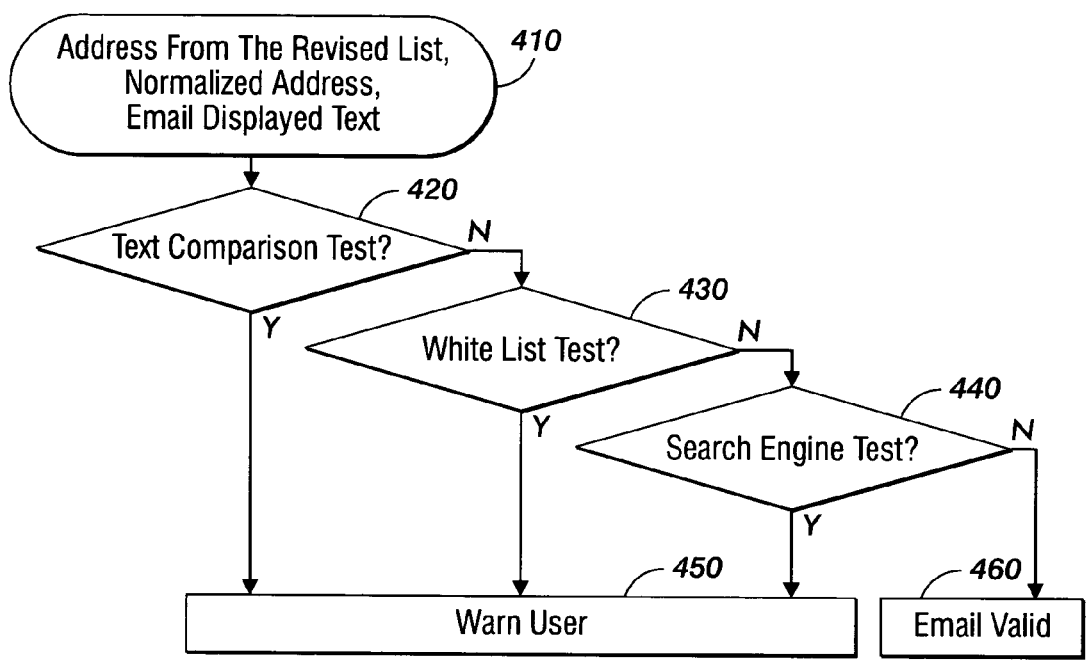
FIG. 4 is a flow chart providing an overview of the operation of the comparison function utilized in the method according to FIG. 2.
Figure 5:
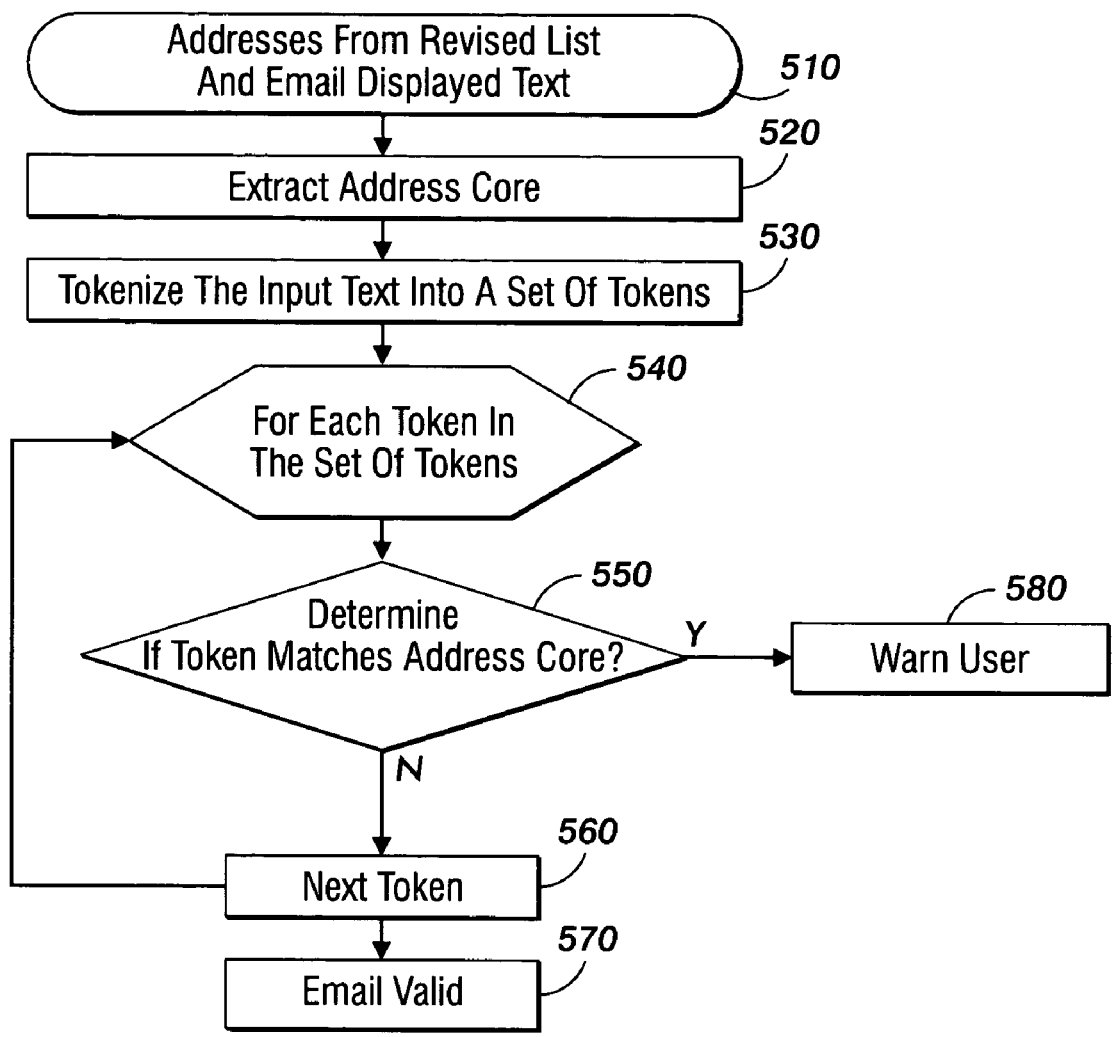
FIG. 5 is a flow chart illustrating the text comparison test presented in FIG. 4.
Figure 6:
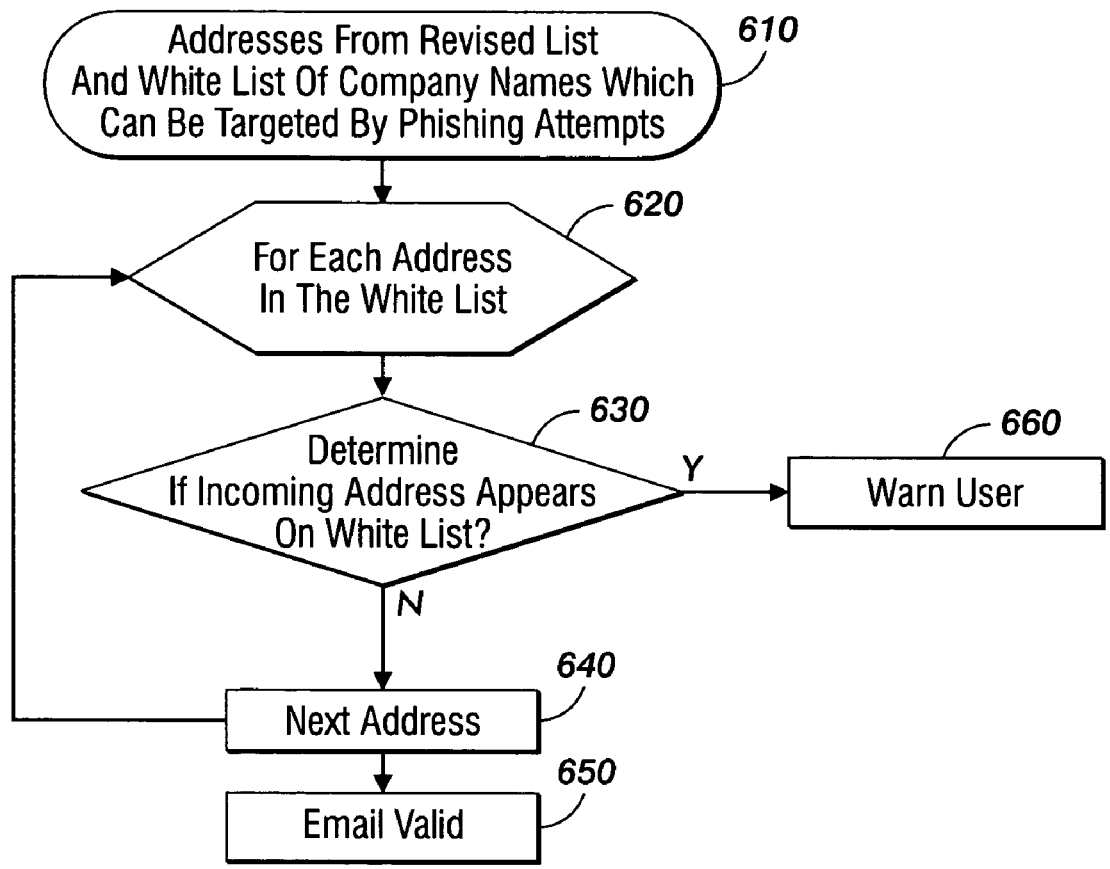
FIG. 6 is a flow chart illustrating the white list comparison test presented in FIG. 4.
Figure 7:
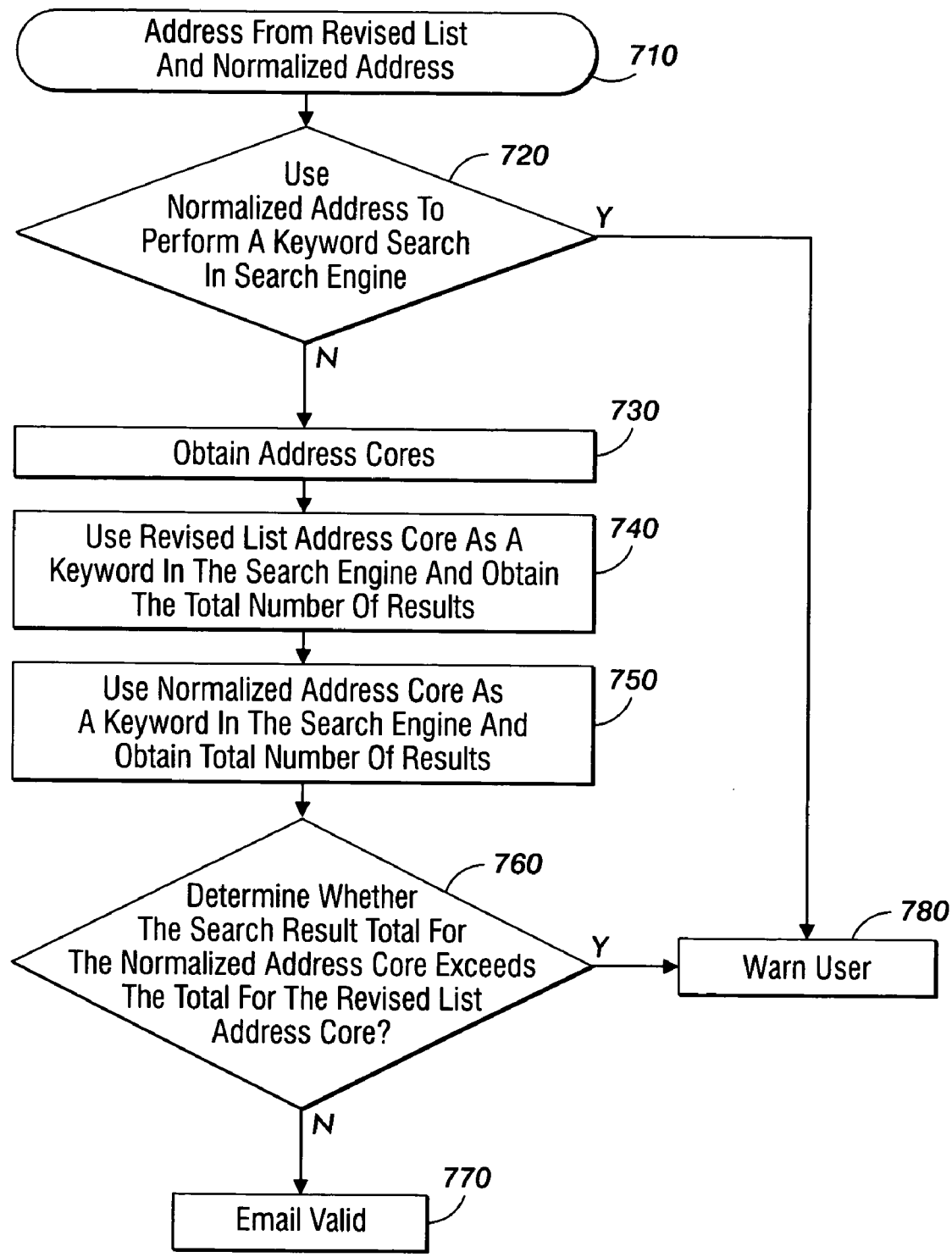
FIG. 7 is a flow chart illustrating the keyword search comparison test presented in FIG. 4.

Turning now to FIG. 4, there is illustrated an overview of the operation of the comparison function utilized in the phishing detection method. At 410, the addresses from the revised list include the address from the Email source, the normalized address, and the Email displayed Text. At 420 a text comparison test, described more fully with respect to FIG. 5, is performed to identify a possible non-valid address(es). If an address is found to be not valid, a warning is returned to the user that the email may be a forgery. If the address tests valid, a white list comparison test, described more fully with respect to FIG. 6, is performed at 430. Again, possible forgeries are reported to the user. If the address being tested still tests as valid, a search engine test, described more fully with respect to FIG. 7, is performed. Possible forged addresses are identified and the user is notified that the address is a forgery. If the address still tests as valid, the email message is valid and accepted. While for the purposes of discussion the various comparison tests are presented in a sequence it is noted that the comparison tests may be applied in any possible sequence or combination.

Turning now to FIG. 5, the flow chart illustrates the text comparison test. At 510, the input includes the addresses from the revised list and the displayed text. For this test, the address core is extracted at 520. The input text is tokenized at 530 into a set of tokens. For each token in the set of tokens at 540, a determination is made at 550 whether the token matches the extracted address core. If a match is present, the address is not valid and the user is notified that the address is a forgery at 580. If a match is not present, the address is possibly valid and the next token in the set of tokens is tested.

For example, an address from the revised list, which includes all addresses generated after normalization of the addresses extracted from the source code could be Account.Security@XY0Z.com or http://www.XY0Z.com/. Applying normalization, an address identical to the true website may be obtained (an address generated using the replacement of 0(zero=ascii 48) into a simple o(ascii 111)). Example Email text could be "For security reasons, please change your login parameters for your XYOZ account:http://www.XYOZ.com". The tokenization of this string will produce the following list of tokens: For, security, reasons, please, change, the, login, parameters, for, your, XYOZ, account, http://www.XYOZ.com. Then when comparing this list of tokens with the list of core addresses extracted from the input 'revised list of addresses', a match between the token "XYOZ" from the displayed text and the "XYOZ" (core address) extracted from one of the addresses in the revised list (the address generated by replacing zero by "o") is noted. Addresses identified as possibly valid are then subject to the white list test.

Referring to FIG. 6, the flow chart illustrates the white list comparison test. Assuming that an email message is a phishing attempt, the addresses in the source may lead to a forged website. If it is possible, through defined modifications (normalization) of these addresses, to produce an address leading to an official website (which may be contained in the White List), there is a likelihood that the message is a phishing attempt. At 610 the input includes the incoming address from the revised list and a white list of company names which may be targeted by phishing attempts, such as banks, e-commerce web sites, etc. For each address in the white list of company names (620), a comparison is made at 630 to determine if the incoming address appears on the white list. If the incoming address appears on the white list, it is found to be not valid and a warning is returned to the user that the email may be a forgery at 660. If a match is not present, the address is possibly valid and the next address is tested at 640. Addresses identified as possibly valid are then subject to the search engine test.

Turning now to FIG. 7, the flow chart illustrates the search engine test. This test utilizes the address from the revised list and the normalized address, as illustrated at 710. The normalized address is used to perform a keyword search in an Internet search engine at 720. If the address is found by the Internet search engine, a message warning the user of a possible phishing attempt is transmitted at 780. If the search is not successful, at 730 the address cores for the revised list address (es) and the normalized addresses are retrieved. The revised list address core is used as a keyword for an Internet search using a search engine such as Google™ at 740 and the total number of results is obtained. At 750 the normalized address core is used as a keyword in a similar Internet search and the total number of results for this search are obtained. The results are compared at 760 to determine whether the number of search results for the normalized address core exceeds the number of results for the revised list address core. If an address is found to be not valid, a warning is returned to the user that the email may be a forgery at 780. If the address is found to be valid, a message is returned to the user that the email is valid and accepted.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for detection of phishing attempts in received electronic mail messages in a networked environment including a plurality of personal computers, and electronic mail server, the method comprising:
    receiving an incoming electronic mail message, wherein said electronic mail message includes an address;
    retrieving the source code of said incoming message;
    retrieving text as displayed to the recipient of said electronic message;
    retrieving a list of all specified addresses from said retrieved source code;
    applying visual character normalization to each said specified address to develop all possible address combinations and to form a normalized address list, said visual character normalization comprises the steps of:
        extracting the address core from said incoming address;
        replacing any character within said address core by its visual homonym,
    wherein said visual homonym includes a homographic character that comprises another character, to form a list of possible address cores;
        performing additional character normalization operations on each of said possible address cores, wherein said additional character normalization operations include at least one member selected from the group consisting of duplicate character normalization, reduced character normalization, plural character normalization, and punctuation character normalization;
        forming lists of new address cores for each of said character normalization operations performed;
        merging said lists of new address cores and said possible address cores and removing duplicate address cores from said merged list to create a composite address core list;
        recombining said composite address core list with the prefixes and suffixes appearing in said incoming electronic mail address to form a recombined list of addresses;
        replacing the suffix of each said recombined address with all other possible suffixes to form a suffix list; and
        merging said suffix list and said recombined list to form said normalized address list;
    removing said specified addresses from said normalized address list to create a revised address list;
    performing at least one comparison test to determine if each address in said revised address list is a valid address;
    returning a message to said recipient that said electronic message may be a forgery if a tested address is found to be not valid;
    performing said comparison tests on another address in said revised address list if said tested address is found to be valid; and
    informing said recipient that said electronic message is valid and accepted if said tested address is found to be valid.

2. The method for detection of phishing attempts in received electronic mail messages according to claim 1, wherein said visual homonym is derived through application of predefined transformation rules for ASCII characters.

3. The method for detection of phishing attempts in received electronic mail messages according to claim 1, wherein said visual homonym is derived through transformation of any Unicode character similar to an ASCII character into its ASCII counterpart.

4. The method for detection of phishing attempts in received electronic mail messages according to claim 1, wherein duplicate character normalization comprises:
    duplicating a first character in a first address core to form a new address core; placing said new address core on a duplicate character address core list;
    duplicating another character in said address core to form another new address core and placing said new address core on said duplicate character address core list;
    continuing to duplicate another character in said address core to create another new address core and placing said new address core on said duplicate character list until all characters in said first address core have been used to create said new address cores; and
    selecting another address core and repeating the sequence of duplicating a character to form a new address core and adding said new address core to said duplicate character list until all characters in said selected another address core have been used to create said new address cores and duplicate character normalization has been applied to all address cores in said list of possible address cores.

5. The method for detection of phishing attempts in received electronic mail messages according to claim 1, wherein reduced character normalization comprises:
    replacing a contiguous duplicated character by a single occurrence of that character in a first address core to form a new address core;
    placing said new address core on a reduced character address core list;
    identifying additional contiguous duplicated characters in said first address core, forming additional new address cores, and placing said additional new address cores on said reduced character address core list until no contiguous duplicated characters remain in said first address core; and
    selecting another address from said list of possible address cores and repeating the sequence of identifying contiguous duplicated characters, forming new address cores, and adding said new address cores to said reduced character address core list until all of said possible address cores have been selected.

6. The method for detection of phishing attempts in received electronic mail messages according to claim 1, wherein plural character normalization comprises:
    adding or removing a plural character at the end of a first address core to form a new address core;

placing said new address core on a plural character address core list; and repeating adding or removing a plural character at the end of each of said possible address cores to form additional new address cores and placing the additional new address cores on the plural character address core list.

7. The method for detection of phishing attempts in received electronic mail messages according to claim 1, wherein punctuation character normalization comprises:
removing a first punctuation character from a first address core to form a new address core;
placing said new address core on a punctuation character address core list; repeating removal of a punctuation character from a first address and placing said new address core on a punctuation character address list until all punctuation characters in said first address core have been removed; and
repeating removal of single punctuation characters and placing said resulting new address core on said punctuation character address until all punctuation characters in all said possible address cores have been removed.

8. The method for detection of phishing attempts in received electronic mail messages according to claim 1, wherein performing said comparison test comprises:
receiving email displayed text and at least one address from said revised list;
extracting the address core from said received at least one address;
tokenizing said email text into a set of tokens;
determining if each said token matches said extracted address core;
returning a message that said received address is not valid if any one of said tokens matches said extracted address core; and
performing said white list comparison test if none of said tokens matches said extracted address core.

9. The method for detection of phishing attempts in received electronic mail messages according to claim 1, wherein performing said comparison test comprises:
receiving a white list of names of companies which may be targeted by phishing attempts and at least one address from said revised list;
determining if any of said names of companies matches the company name appearing in said received at least one address;
returning a message that said at least one address is not valid if any one of said names of companies matches said name appearing in said at least one address; and
performing a search engine comparison test if none of said names of companies matches said received at least one address.

10. The method for detection of phishing attempts in received electronic mail messages according to claim 1, wherein performing said comparison test comprises:
receiving at least one normalized address and at least one address from said revised list;
performing a search of said at least one normalized address in an Internet search engine;
returning a message that said at least one normalized address is not valid if said normalized address search locates said at least one normalized address;
extracting address cores for said at least one address from said revised list and said at least one normalized address;
performing a keyword search in an Internet search engine and obtaining a total number of results, wherein said keyword consists of said at least one revised list address core;
performing a keyword search in an Internet search engine and obtaining a total number of results, wherein said keyword consists of said normalized address core;
determining whether the total number of search results for said at least one normalized address core exceeds the total number of results for said at least one revised list address core;
returning a message that said at least one revised list address is not valid if the total number of search results for said at least one normalized address core exceeds the total number of results for the at least one revised list address core; and
returning a message that said at least one revised list address is valid if the total number of search results for said at least one normalized address core does not exceed the total number of results for said at least one revised list address core.

11. A system for detection of phishing attempts in received electronic mail messages in a networked environment including a plurality of personal computers, and electronic mail server, the method comprising:
means for receiving an incoming electronic mail message, wherein said electronic mail message includes an address;
means for retrieving the source code of said incoming message;
means for retrieving text as displayed to the recipient of said electronic message;
means for retrieving a list of all specified addresses from said retrieved source code;
means for applying visual character normalization to each said specified address to develop all possible address combinations and to form a normalized address list, wherein applying said visual character normalization comprises:
means for extracting the address core from said incoming address;
replacing any character within said address core by its visual homonym,
wherein said visual homonym includes a homographic character comprising another character, to form a list of possible address cores;
means for performing additional character normalization operations on each of said possible address cores, wherein said additional character normalization operations include at least one member selected from the group consisting of duplicate character normalization, reduced character normalization, plural character normalization, and punctuation character normalization;
means for forming lists of new address cores for each of said character normalization operations performed;
means for merging said lists of new address cores and said possible address cores and removing duplicate address cores from said merged list to create a composite address core list;
means for recombining said composite address core list with the prefixes and suffixes appearing in said incoming electronic mail address to form a recombined list of addresses;
means for replacing the suffix of each said recombined address with all other possible suffixes to form a suffix list; and
means for merging said suffix list and said recombined list to form a normalized address list; means for removing said specified addresses from said normalized address list to create a revised address list;

means for performing comparison tests to determine if each address in said revised address list is a valid address;

means for returning a message to said recipient that said electronic message may be a forgery if a tested address is found to be not valid;

means for performing said comparison tests on another address in said revised address list if said tested address is found to be valid; and means for informing said recipient that said electronic message is valid and accepted if said tested address is found to be valid.

12. The system for detection of phishing attempts in received electronic mail messages according to claim 11, wherein performing said comparison test comprises:

means for receiving email displayed text and at least one address from said revised list;

means for extracting the address core from said received at least one address;

means for tokenizing said email text into a set of tokens;

means for determining if each said token matches said extracted address core;

means for returning a message that said received address is not valid if any one of said tokens matches said extracted address core; and means for performing said white list comparison test if none of said tokens matches said extracted address core.

13. The system for detection of phishing attempts in received electronic mail messages according to claim 11, wherein performing said comparison test comprises:

means for receiving a white list of names of companies which may be targeted by phishing attempts and at least one address from said revised list;

means for determining if any of said names of companies matches the company name appearing in said received at least one address;

means for returning a message that said at least one address is not valid if any one of said names of companies matches said name appearing in said at least one address; and means for performing a search engine comparison test if none of said names of companies matches said received at least one address.

14. The system for detection of phishing attempts in received electronic mail messages according to claim 11, wherein performing said comparison test comprises:

means for receiving at least one normalized address and at least one address from said revised list;

means for performing a search of said at least one normalized address in an Internet search engine;

means for returning a message that said at least one normalized address is not valid if said normalized address search locates said at least one normalized address;

means for extracting address cores for said at least one address from said revised list and said at least one normalized address;

means for performing a keyword search in an Internet search engine and obtaining a total number of results, wherein said keyword consists of said at least one revised list address core;

means for performing a keyword search in an Internet search engine and obtaining a total number of results, wherein said keyword consists of said normalized address core;

means for determining whether the total number of search results for said at least one normalized address core exceeds the total number of results for said at least one revised list address core;

means for returning a message that said at least one revised list address is not valid if the total number of search results for said at least one normalized address core exceeds the total number of results for the at least one revised list address core; and means for returning a message that said at least one revised list address is valid if the total number of search results for said at least one normalized address core does not exceed the total number of results for said at least one revised list address core.

15. A non-transitory computer-readable storage medium having computer readable program code embodied in said medium which, when said program code is executed by a computer causes said computer to perform method steps for detection of phishing attempts in received electronic mail messages in a networked environment including a plurality of personal computers, an electronic mail server, the method comprising:

receiving an incoming electronic mail message, wherein said electronic mail message includes an address;

retrieving the source code of said incoming message;

retrieving text as displayed to the recipient of said electronic message;

retrieving a list of all specified addresses from said retrieved source code;

applying visual character normalization to each said specified address to develop all possible address combinations and to form a normalized address list, wherein applying said visual character normalization comprises the steps of:

extracting the address core from said incoming address;

replacing any character within said address core by its visual homonym, wherein said visual homonym includes a homographic character comprising another character, to form a list of possible address cores;

performing additional character normalization operations on each of said possible address cores, wherein said additional character normalization operations include at least one member selected from the group consisting of duplicate character normalization, reduced character normalization, plural character normalization, and punctuation character normalization;

forming lists of new address cores for each of said character normalization operations performed;

merging said lists of new address cores and said possible address cores and removing duplicate address cores from said merged list to create a composite address core list;

recombining said composite address core list with the prefixes and suffixes appearing in said incoming electronic mail address to form a recombined list of addresses;

replacing the suffix of each said recombined address with all other possible suffixes to form a suffix list; and merging said suffix list and said recombined list to form said normalized address list;

removing said specified addresses from said normalized address list to create a revised address list;

performing comparison tests to determine if each address in said revised address list is a valid address;

returning a message to said recipient that said electronic message may be a forgery if a tested address is found to be not valid;
performing said comparison tests on another address in said revised address list if said tested address is found to be valid; and informing said recipient that said electronic message is valid and accepted if said tested address is found to be valid.

* * * * *